(12) United States Patent
Townend (10) Patent No.: US 9,794,119 B2
(45) Date of Patent: Oct. 17, 2017

(54) METHOD AND SYSTEM FOR PREVENTING THE PROPAGATION OF AD-HOC NETWORKS

(71) Applicant: BRITISH TELECOMMUNICATIONS public limited company, London (GB)

(72) Inventor: David Paul Townend, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 274 days.

(21) Appl. No.: 14/385,291

(22) PCT Filed: Feb. 22, 2013

(86) PCT No.: PCT/GB2013/000076
§ 371 (c)(1),
(2) Date: Sep. 15, 2014

(87) PCT Pub. No.: WO2013/136033
PCT Pub. Date: Sep. 19, 2013

(65) Prior Publication Data
US 2015/0036539 A1 Feb. 5, 2015

(30) Foreign Application Priority Data

Mar. 14, 2012 (EP) .................................. 12250055

(51) Int. Cl.
*H04L 12/24* (2006.01)
*H04W 48/12* (2009.01)
(Continued)

(52) U.S. Cl.
CPC .......... *H04L 41/0816* (2013.01); *H04L 41/12* (2013.01); *H04W 24/02* (2013.01);
(Continued)

(58) Field of Classification Search
CPC . H04L 41/0816; H04L 41/12; H04L 63/1491; H04W 24/02; H04W 84/18; H04W 88/08; H04W 48/12
See application file for complete search history.

(56) References Cited

U.S. PATENT DOCUMENTS 7,295,524 B1 * 11/2007 Gray ................... H04L 63/1416
370/254
7,577,125 B2 * 8/2009 Abhishek .............. H04W 72/02
370/328

(Continued)

OTHER PUBLICATIONS

Cisco, Rogue Management in a Unified Wireless Network, Aug. 10, 2010.*

(Continued)

*Primary Examiner* — Tejis Daya
(74) *Attorney, Agent, or Firm* — Nixon & Vanderhye PC (57) ABSTRACT

A network management system (19) associated with monitors activity in a first wireless access network (100, 101, 102), for the effect of rogue user terminals (22) transmitting beacons for ad-hoc networks. If it is detected that such an ad hoc network would pose a threat to the integrity of the fixed network and that it is necessary to contain the spread of the ad-hoc network, a network detection unit (32) determines the parameters of the ad-hoc network, from the beacons being transmitted by the terminal (22). A network configuration unit (34) creates an additional network identity for a second network, having the same name as the rogue network but having a higher security setting which will cause any user terminals to preferentially connect to the additional network instead of the second network. The network configuration unit then generates beacons for this additional network identity to be transmitted by the access point (100) which first detected the beacon, which allows the network management system to control and contain the expansion of
(Continued)

the second, ad hoc, network preventing it disrupting the channel plan for the first network.

11 Claims, 5 Drawing Sheets

(51) Int. Cl.
    *H04W 84/18*     (2009.01)
    *H04W 88/08*     (2009.01)
    *H04W 24/02*     (2009.01)

(52) U.S. Cl.
    CPC ........... *H04W 48/12* (2013.01); *H04W 84/18* (2013.01); *H04W 88/08* (2013.01)

(56) References Cited

U.S. PATENT DOCUMENTS

| | | | |
|---|---|---|---|
| 7,885,602 B1 | 2/2011 | Kelsey et al. | |
| 8,069,483 B1* | 11/2011 | Matlock | H04W 12/12 713/154 |
| 8,374,122 B2* | 2/2013 | Meier | H04W 8/005 370/328 |
| 8,982,785 B2* | 3/2015 | Pandey | H04W 4/00 370/328 |
| 2005/0239463 A1* | 10/2005 | Lagnado | H04W 48/18 455/435.2 |
| 2005/0268337 A1* | 12/2005 | Norton | H04L 63/0209 726/23 |
| 2006/0221927 A1* | 10/2006 | Yamada | G06F 21/606 370/345 |
| 2007/0214283 A1* | 9/2007 | Metke | H04L 29/12066 709/245 |
| 2007/0298720 A1* | 12/2007 | Wolman | H04L 63/1408 455/66.1 |
| 2008/0052779 A1* | 2/2008 | Sinha | H04L 63/1441 726/22 |
| 2008/0194201 A1* | 8/2008 | Sinivaara | H04W 52/0216 455/41.2 |
| 2013/0150012 A1* | 6/2013 | Chhabra | H04W 48/16 455/418 |

OTHER PUBLICATIONS

D. Dai Zovi, et al. "Attacking Automatic Wireless Network Selection" Systems, Man and Cybernetics (SMC) Information Assurance Workshop 200 5 Proceedings from the Sixth Annual IEEE West Point, NY, Jun. 15-17, 2005, Piscataway, NJ, 10 pages.

International Search Report for PCT/GB2013/000076, dated May 15, 2013.

\* cited by examiner

METHOD AND SYSTEM FOR PREVENTING THE PROPAGATION OF AD-HOC NETWORKS

This application is the U.S. national phase of International Application No. PCT/GB2013/000076, filed 22 Feb. 2013, which designated the U.S. and claims priority to EP Application No. 12250055.6, filed 14 Mar. 2012, the entire contents of each of which are hereby incorporated by reference.

BACKGROUND AND SUMMARY

This invention relates to the operation of wireless local area communications networks, such as those operating to the IEEE 802.11 standard commonly known as "Wi-Fi". Such systems are widely available and provide access to a telecommunications network, such as the "Internet" for any suitably equipped wireless user terminal, using a wireless interface. Such systems are commonly provided in areas where mobile users may require access to the Internet using their own wireless terminals. Access may be subject in some cases to access control requirements (password control), but the present invention is more concerned with public access systems.

In a typical configuration, an infrastructure or managed Wi-Fi network is used to provide public access/hotspot style wireless internet services, using fixed access points to operate as portals between the user terminals and the wider network. If several such access points are required to cover a large space with the potential to generate a lot of traffic, such as a stadium, the access points can be configured to operate according to a channel plan, in order to avoid interference between them and maximise capacity.

The 802.11 standard also allows for ad-hoc or peer-to-peer networks to be created. Formally these are known as IBSS (independent basic service set) networks. In such systems individual wireless stations communicate directly with each other. When established an IBSS consists solely of client stations that are directly connected without the requirement of a centralised access point or wireless router. Within the system there is no physical distribution system, portal, or integrated wired LAN. This allows data to be exchanged between individual members of the group, but cannot communicate with the wider "Internet" unless at least one of the group is also connected to an external access point.

Networks using the 802.11 protocols advertise their existence to potential clients by generating beacon management frames as a means of detailing the network configuration, and to maintain synchronisation of any stations currently connected. In an infrastructure or managed Wi-Fi fixed network the access points generate the beacons, whilst beacon generation in an ad-hoc (IBSS) network is distributed between all stations. When a station joins an ad-hoc network it too must participate in beacon frame generation in the absence of a centralised access point. Each station maintains its own timer to maintain the beacon interval within the ad-hoc network.

In a standard network configuration, management and control traffic is typically transmitted at the lowest modulation rate possible (lowest bitrate), this is to maximise the coverage area and ensure robustness of broadcast traffic within the service environment.

With the proliferation of Wi-Fi enable devices such as smartphones and the ever growing demand for internet or data connectivity there exists a behaviour of the ad-hoc protocol that can severely increase network congestion in certain environments. The implementation of network connection managers in some client devices (referred to herein as 'susceptible' or 'vulnerable' devices) can allow the (accidental or malicious) propagation of ad-hoc networks in public areas. This issue is a particular problem when the ad-hoc network beacons advertise themselves as providing "free" internet access, which they cannot in fact provide unless they also have an external connection, thereby enticing users who are looking for Wi-Fi connectivity to connect to an ad-hoc network, rather than through the fixed access points installed for the purpose. In a location like a stadium or concert hall this can result in a large number of Wi-Fi enabled devices flooding the area with management or control traffic associated with such ad-hoc networks this can significantly reduce available capacity and service availability of the installed network.

It is a feature of the connection management process that the user devices will not display more than one network having the same network name (SSID—"service set identifier"), regardless of the number of beacon messages received. Another feature provides that, in the event of some beacon messages stating that the network requires a security mechanism to be employed (e.g. WPA/WPA2/802.1x), the existing connection management process offers the beacon message with that requirement in preference to any of the same name and SSID. Consumer products may also prioritise network selection by other criteria, such as signal strength, or infrastructure type (BSS or IBSS).

The default behaviour of the connection manager (the software that manages any Wi-Fi network connections) of a user device is to add any network to which it successfully connects as a 'preferred network' and in doing so the device will continually attempt to search for and join this network until it is either turned off or connects to another network. If this network were a standard infrastructure network (i.e. using an access point) the device would passively issue probe request frames and wait for a response to identify if this 'preferred' network was in the vicinity. However, if the network is an ad-hoc network the default behaviour of the device is to issue further beacon advertisements and await another device to make a peer-to-peer connection with itself. Where the network name (SSID, service set identifier) is enticing to surrounding users (e.g appearing to offer a free public Wi-Fi service), and the implementation of the device connection manager either allows this type of network or does not distinguish between an ad-hoc or infrastructure network, a number of other users will inevitably attempt to connect. In doing so these new devices also become members of the ad-hoc network and in turn participate in the generation of the network beacon advertisements. This behaviour will continue even if the original ad-hoc source is subsequently moved out of the environment or disabled. The resultant behaviour is a propagation of this network (over time and distance) through every device that attempts to make a connection, this then becoming in effect a viral network.

Should such a device subsequently enter the coverage environment of an infrastructure or managed Wi-Fi network used to provide public access/hotspot style wireless internet services in a publicly accessible area such as a stadium, this behaviour can result in a substantial and rapid increase in network traffic as all beacon advertisements are sent at the lowest bit rates and potentially from a large number of devices as more and more users attempt connection. As with many WIPS/WIDS (wireless intrusion protection/wireless intrusion detection systems), the presence of such an ad-hoc or rogue access point within a managed network can be detected, and the necessary alarms raised through the managed access points or dedicated wireless sensors. A typical but crude method of dealing with such a threat is for the network to spoof de-authentication frames to any client that attempts a connection to the ad-hoc or rogue source. This technique would result in the disabling of any terminal which attempts to connect as soon as a connection is established. However, such a method is effectively a denial of service attack on the client devices attempting connection. In a private or restricted environment where only managed network equipment is permitted, this may be perceived as a valid technique, although it is unlikely to be popular with the users of the devices in question. However in a public environment such techniques may not be permitted.

The primary focus of existing techniques is to prevent legitimate clients connecting to potentially insecure or malicious networks that pose a security threat to the wider network. While such techniques may be effective for rogue access points they are unable to contain the propagation behaviour of ad-hoc networks within some connection manager implementations. As described earlier once a vulnerable device has initiated an ad-hoc connection, it will continue to broadcast beacon frames even without the presence of other participating stations.

The present invention focuses on preventing the propagation of the ad-hoc network through vulnerable devices, with the aim of maximising potential bandwidth in critical scenarios.

It is known from U.S. Pat. No. 7,885,602 (Kelsey et al) to operate a network security system in such a way as to disrupt a rogue ad hoc network by fragmenting it into two or more smaller networks which are unable to communicate directly with each other. However, the control signals needed to disrupt the rogue network could actually increase traffic in the short term before containment is achieved.

The present invention provides a technique for preventing viral ad-hoc network propagation in wireless networks using a reactive system that allows containment of the ad-hoc network through exploiting the connection manager implementation of the vulnerable devices.

According to the invention, there is provided a method of operating an access point for a first wireless area network system comprising the steps of:

monitoring for beacon signals transmitted within the area of coverage of the access point on detection of a beacon signal, determining whether the beacon signal advertises a second wireless network, the second wireless area network being an ad-hoc network, on such determination, initiating a network reconfiguration in the same environment as the second wireless network, by generating a new network identity matching that of the second wireless network, but having a higher-level security mechanism than the second wireless network such that mobile devices default to the new network identity in preference to the second wireless network, and transmitting a beacon signal with the new network identity.

As well as the security mechanism, the system may also use other factors such as the presence of a default setting in the user devices providing for infrastructure-type networks to take precedence over ad-hoc types, or simply defaulting to the beacon with the greatest transmit power, although an appropriate level may be difficult to determine where the distance of the access point from the user terminals is much greater than the inter-terminal distances, for example in a crowded stadium.

In one embodiment, the access point determines whether operation of the second wireless network is potentially disruptive of the operation of the first wireless network, and initiates the network reconfiguration if it is so determined.

This determination may involve assessment of how many mobile terminals have joined the second wireless network, analysis of the SSID or network identity of the second wireless network, determination of the security level required to access the second wireless network, or any combination of these factors.

The invention also provides a network management system for controlling one or more access points for a first wireless area network system, comprising a monitoring system for monitoring beacon signals transmitted within the area of coverage of the access point a detection system for determining whether beacon signals detected by the monitoring system advertise a second wireless network, the second wireless area network being an ad-hoc network, security detection means to detect a first security level required to access the second wireless network, a network reconfiguration system for generating a new network identity matching that of the second wireless network, but requiring a second security level for access, the second security level being higher than the first security level, such that mobile devices default to the new network identity in preference to the second wireless network, and arranged to cause at least one of the access points to transmit a beacon with the new network identity.

In the preferred arrangement the new network identity is configured such that it prevents the network identity relating to the second wireless network being made available to a connection manager function of a mobile terminal receptive to both the beacon signal of the second wireless network and the beacon signal containing the new network identity. In the embodiment to be described it is convenient for the new identity to replace the network identity relating to the second wireless network in the menu presented to the user.

A group of access points co-operating to provide coverage over a predetermined area may co-operate to transmit the new network identity in response to one member of the group identifying the presence of a second wireless network of the kind described.

The security mechanism employed may be, for example, of type WPA/WPA2/802.1x.

The intent of this reconfiguration is to exploit the connection manager implementation of the vulnerable devices which are only capable of displaying a single network of the same name/SSID. In the environment where the reconfiguration/containment has occurred the vulnerable devices will only show the infrastructure type network in the wireless network availability list from the device's connection manager, regardless of signal strength. This technique can be used to prevent new devices connecting to the ad-hoc network as the containment network acting as a 'honeypot' takes priority over an ad-hoc network on the device, any subsequent connection which would ordinarily begin the propagation of the ad-hoc network cannot occur. The layer of security added also serves the purpose of preventing the containment network being added to the preferred networks list; an incomplete connection (due the lack of security credentials on connecting devices) will not be added to the 'preferred network' list.

In tests, such a technique has been shown to be successful in preventing the most susceptible device types from joining the ad-hoc source and propagating the network through surrounding devices.

In an environment with a channel allocation plan based on multiple fixed access points, the access point first detecting the rogue ad-hoc network can be used to initiate the same procedure on the other access points, to prevent propagation to the rest of the area of coverage.

The determination step can use decision-making processes that assess the risk to the network from any rogue ad-hoc network that has been identified. This process may involve a number of input variables including the settings of the detected ad-hoc network e.g. the SSID name, the security or authentication settings and the proximity to other vulnerable devices within the network or environment. This may be rule-based, responding to 'inviting' SSID names, or names existing in a (pre-defined) database of known viral networks which would pose a higher risk than an innocuous ad-hoc SSID. In addition a network that has security settings configured as 'Open' or unsecured would be identified as requiring containment as it would allow any device to connect and proliferate the undesirable ad-hoc behaviour. The system may also take account of other devices in the network to make a decision of whether to employ the containment method. This may be achieved through inspection of any currently unconnected client MAC (media access control) addresses in the areas, a high concentration of devices from specific manufacturers (by analysis of the OUI [Organizationally Unique Identifier] octets in addresses) for example could indicate a higher risk than usual. The system may also keep track of the ad-hoc device through feedback from all managed access points and employ the proposed method anywhere where the device moves within the network, this would allow either permanent containment of the ad-hoc network or allow time in which the device could be located and the user requested to remove the ad-hoc 'preferred network' entry from the device.

BRIEF DESCRIPTION OF THE DRAWINGS

An embodiment of the invention will now be described with reference to the drawings, in which.

DETAILED DESCRIPTION OF PRESENT EXAMPLE EMBODIMENTS

Figure 1:
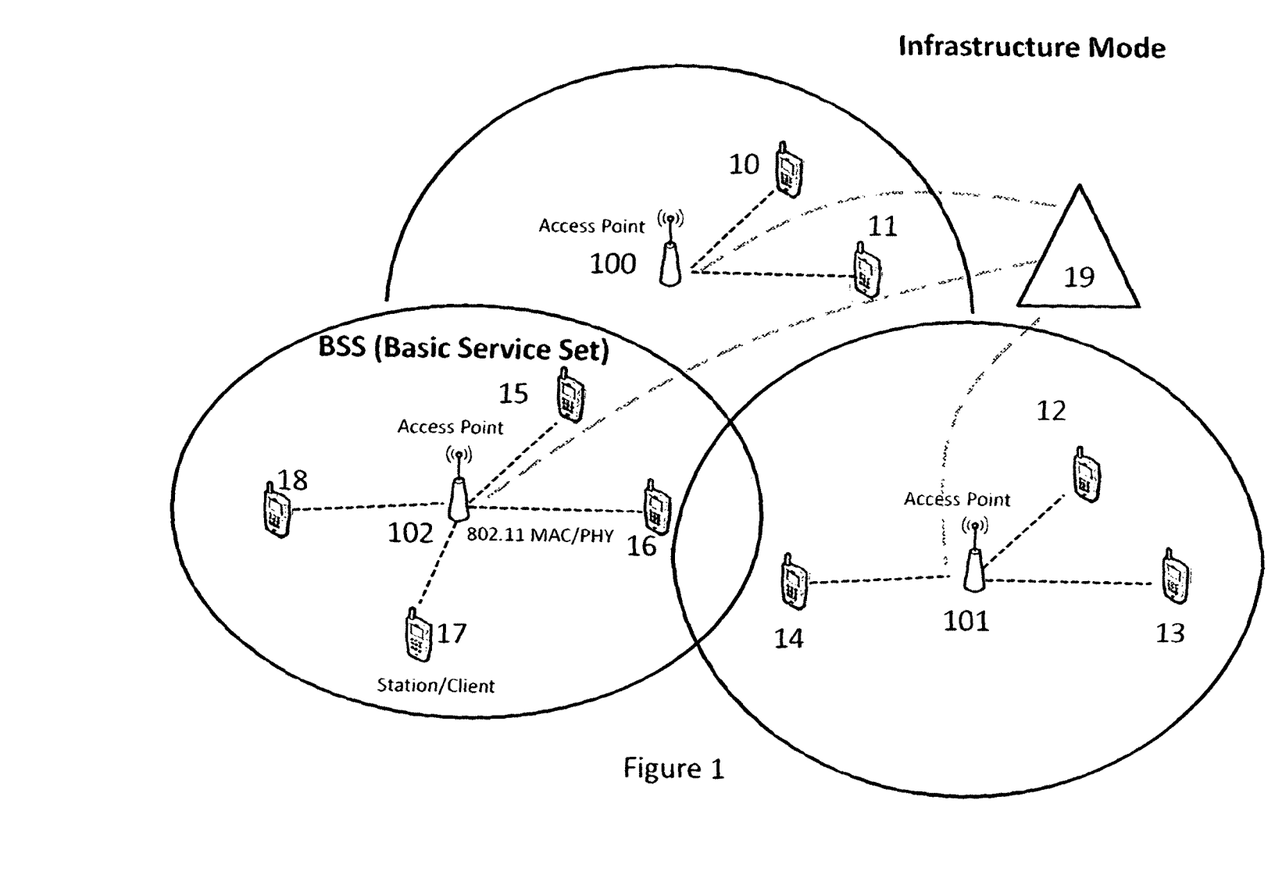
FIG. 1 is a schematic illustration of a wireless access system using a fixed access point.

FIG. 1 depicts an access point 100 operating under the Basic Service Set (BSS) of the 802.11 Wireless LAN standard, and providing internet access for any suitably-equipped mobile terminals (clients) 10, 11 within range of the access point. For wider areas of coverage, such an access point may co-operate with one or more further access points 101, 102, serving further terminals 12, 13, 14, 15, 16, 17, 18. The access points 100, 101, 102 can be configured by the installer to co-operate on channel allocation etc using a network management system 19, in order to optimise use of the radio spectrum and avoid interference between the traffic to and from the respective access points 100, 101, 102.

Figure 2:
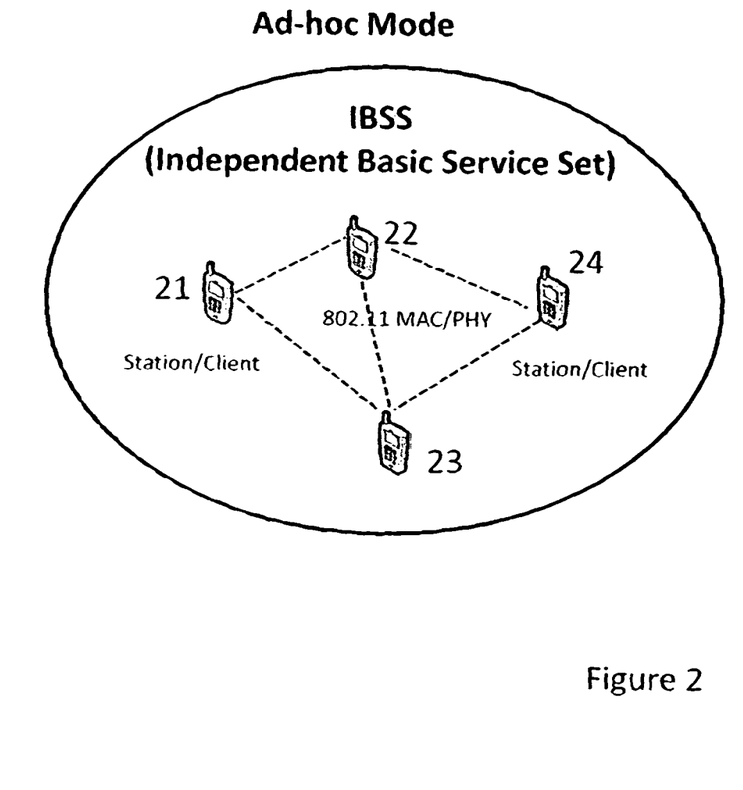
FIG. 2 is a schematic illustration of a wireless access system using an ad-hoc system.

FIG. 2 depicts an "ad-hoc" wireless LAN operating under the same 802.11 wireless standard, using the IBSS (independent basic service set). In this system there is no access point through which all mobile terminals communicate. Instead, the individual wireless stations 21, 22, 23, 24 communicate directly with each other. When established, an IBSS consists solely of client stations that are directly connected without the requirement of a centralised access point or wireless router. This allows data to be exchanged between individual members of the group, they but cannot communicate with the wider "Internet" unless at least one of the group is also connected to an external access point. Note that there is no centralised network management function.

Figure 3:
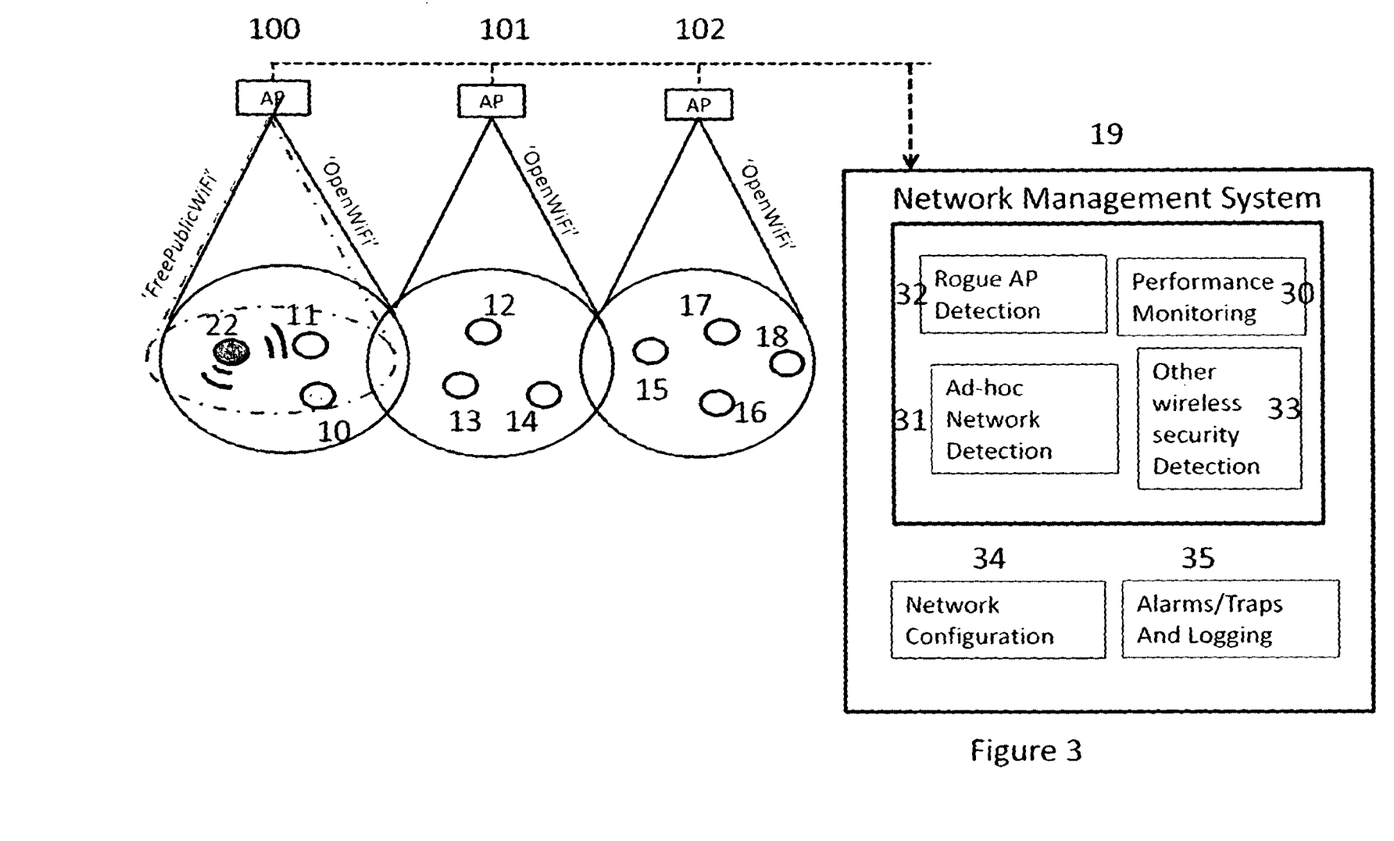
FIG. 3 is a schematic illustration of a wireless access system configured to operate according to the invention

Both the infrastructure (BSS) and ad-hoc (IBSS) modes advertise their existence by the transmission of "beacon" messages. In the BSS mode the access points 100, 101, 102 transmit the beacons, and the mobile terminals 10, 11, 12, 13, 14, 15, 16, 17, 18 respond by registering with one of the access points. In IBSS mode, the beacons are transmitted by any mobile station (e.g. 21) already registered with the ad-hoc network, and invite further mobile stations (e.g. 22, 23) to join the ad-hoc network. If the users accept the invitation, these terminals 22,23 also in turn start to transmit beacons as well, which may be detected by further terminals (e.g. 24) thereby expanding the ad-hoc network beyond the range available to any single terminal. It should be noted that, once the ad-hoc network is established, it may evolve as further terminals join or leave it. In particular, the originating terminal 21 may be removed from the system, either by being moved out of range, switched off, or having ad-hoc capability disabled, and the network will continue with any other terminals that are still connected. Furthermore, any of the terminals may continue to broadcast advertisement beacons until it is switched off or disabled, whether or not any other terminals remain in range. As illustrated in FIG. 3, this can lead to a problem if such a terminal 22, whilst still transmitting beacons, is then taken into a region where there are a large number of terminals 10, 11, 12, 13, 14, 15, 16, 17, 18. Any or all of these terminals could potentially respond to the advertisement beacons transmitted by the terminal 22, and in turn transmit beacons so that a very large ad-hoc network could develop. This could cause significant congestion or interference with a managed network in the same region, and in particular where one or more fixed access points 100, 101, 102 are installed operating in a managed infrastructure mode (BSS).

Similar problems would arise if someone were to attempt to initiate a new ad-hoc network within such an existing managed coverage area.

In order to actively join either type of network, each user has to respond to a beacon, but there is no overall control over the content of the SSID messages that appear to the user—these are defined by the originator of the ad hoc network. However, unless one or more of the terminals in the ad-hoc network have access to the external network, for example through an access point 100, 101, 102, the users of any terminals that join the ad-hoc network will not have access to any network addresses except the other members of the ad-hoc network. Any terminal which does have access to the external network as well as the ad-hoc network would rapidly become overloaded by the traffic on offer.

FIG. 3 depicts a network management system 19 configured to operate according to the invention, together with the network it is to manage. As in FIG. 1, there are a number of access points 100, 101, 102 all under the control of the network management system 19, and a number of mobile terminals 10, 11, 12, etc each in the coverage area of one or other of the access points. The Access points transmit beacons advertising their presence to the users of the mobile terminals with an SSID/network name for display on receiving terminals such as "OpenWi-Fi".

Also depicted in FIG. 3 is a further user terminal 22 (herein referred to as a "rogue" terminal) which has at some previous time been given access to an ad-hoc network such as that depicted in FIG. 2. It is therefore also transmitting beacon signals, in an attempt to re-establish connection with the ad-hoc network from which it has become detached. These beacons advertise themselves with an SSID for display on receiving terminals, such as "FreePublicWi-Fi".

Figure 5A:
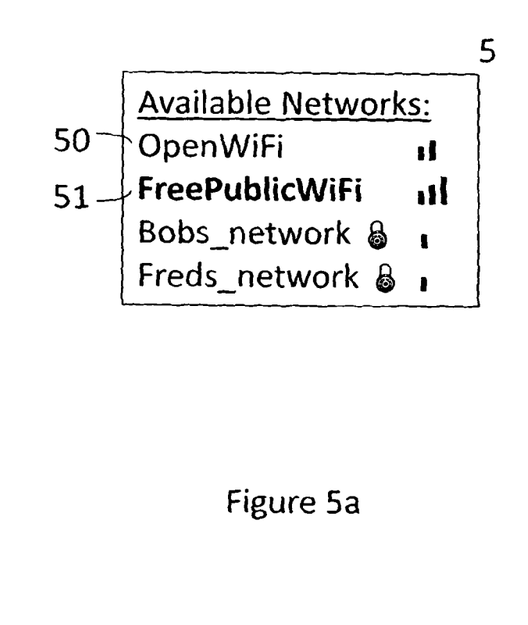
FIG. 5a illustrates the connection manager display of a user terminal when a rogue ad-hoc network is present

As shown in FIG. 5*a*, both the SSID 50 from the access point 100 and the SSID 51 from the rogue terminal 22 will appear in the list 5 of Wi-Fi networks available to users of nearby terminals 10, 11 (see FIG. 5*a*), and depending on the relative attractions of the SSID names the users of these terminals may select one or other of them. Any terminals that select the ad-hoc network will themselves participate in the ad-hoc beacon generation, thereby causing expansion of the ad-hoc network. Given a sufficient density of terminals, a runaway cascade effect can occur, swamping the area with beacon and probe response signals from a large number of terminals from one or more logically disparate ad-hoc networks, none of which can actually communicate with the outside world as the ad-hoc network has no external connections. Moreover, the cascade of beacon signals (and associated probe response frames to surrounding clients that are scanning) disrupts the channel allocation plan of the fixed network 100, 101, 102, and the resulting congestion interferes with the operation of the fixed network.

Figure 4:
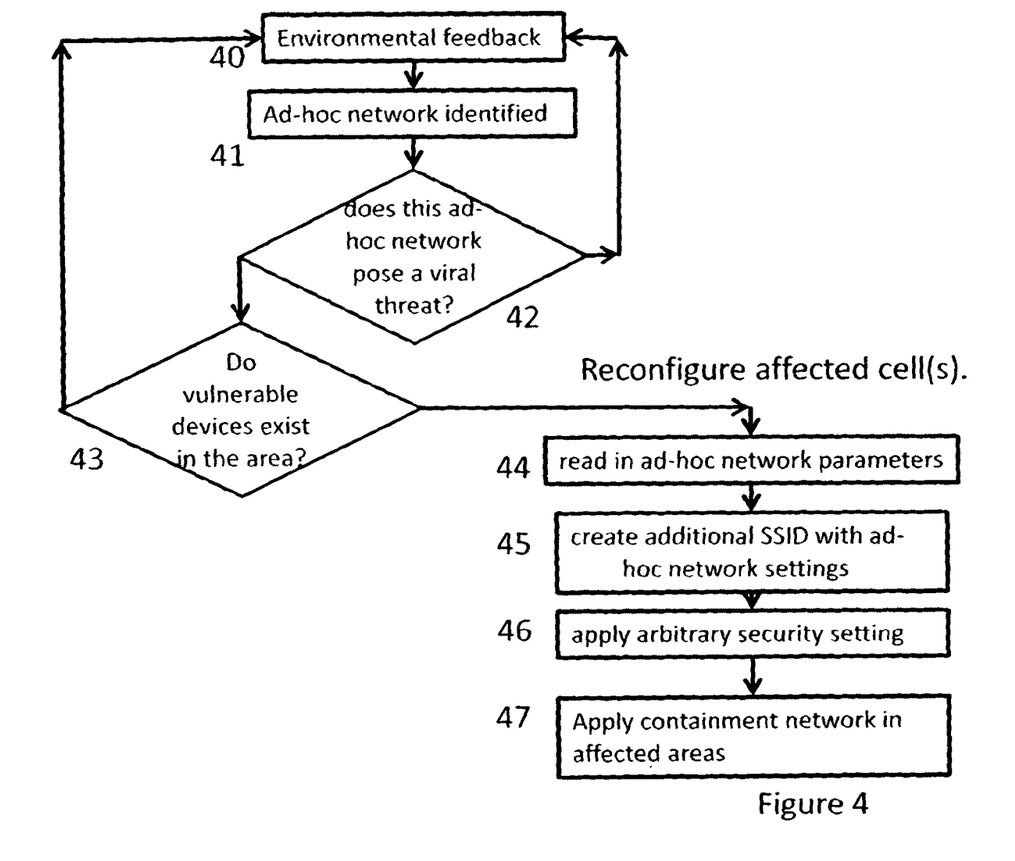
FIG. 4 is a flow chart illustrating the process

In order to avoid this problem the Network Management System 19 operates the process depicted in FIG. 4. In doing so it makes use of the functional elements depicted in FIG. 3, which will typically be embodied in software installed in the operating system of the network management system. These functional elements include a performance monitoring system 30, an ad-hoc network monitor 31, a detection unit 32, a security alert system 33, a network configuration unit 34 and an alarm and logging system 35.

The performance monitoring unit 30 uses data from the access points 100, 101, 102 to monitor activity in the fixed network (step 40), and in particular monitors for the effect of rogue beacons on network capacity. The ad-hoc network detection unit 31 distinguishes any beacons for ad-hoc networks from those for fixed access points, for example located in neighbouring properties, by determining whether they use IBSS instead of the BSS settings. In particular only the IBSS causes responsive mobile stations to transmit their own advertisement beacons if they attempt to join.

If the ad-hoc network detection unit 31 identifies the presence of a mobile station 22 issuing ad-hoc beacons (step 41) the detection unit 32 then determines whether the network poses a threat to the integrity of the fixed system (step 42). Factors which may be taken into account may include whether access to the network is subject to a security provision (assessed by the wireless security unit 33), which would limit the number of other terminals which can access it, or the presence of particular SSID names such as "free internet access" or "free public Wi-Fi". A further check (43) may be made to determine whether there are a significant number of unconnected mobile devices in the area of coverage at the time, which would cause the ad-hoc network to spread.

Empirical measures, such as a rapid spread of beacon messages across the area of coverage, may also trigger the network management system to bring containment measures into play.

An alert or log of the presence of the rogue unit may be generated by the alarm logging unit 35.

If it is determined that it is necessary to contain the spread of the ad-hoc network, the detection unit 32 next reads the beacon messages (step 44), as a terminal would if it were to join the ad-hoc network, to determine the parameters of the ad-hoc network. However, instead of joining the network, the network configuration unit 34 management system creates an additional SSID for a second network (step 45). The SSID for this second network is identical to that which was detected in all respects, except that it also includes a security setting (step 46) set up by the security unit 33, requiring a user identity and password to access it.

The network configuration unit then generates beacons for this second SSID, to be transmitted by the access point 100 which first detected the beacon (and possibly other access points 101, 102) (step 47).

Figure 5B:
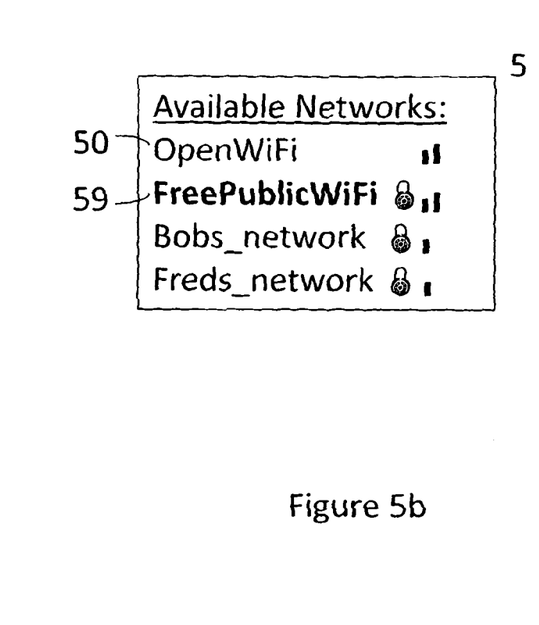
FIG. 5b illustrates the connection manager display after the process of the invention has operated.

It is a feature of most device connection manager implementations that the user is presented with just one instance of each SSID, regardless of how many beacons the user device detects: typically the beacon/access point with the strongest signal strength takes precedence. However, if the user device detects duplicate instances of an SSID, some of which have a higher security level than others, it defaults to the highest security level. This has the effect that unsecured users cannot hack into a security-protected network. In the present invention, these two features result in the SSID generated by the network management system 19 taking precedence over, and displacing, the SSID generated by the rogue unit 22, as shown by comparison between FIGS. 5*a* and 5*b*. In FIG. 5*a*, without the containment measures in place, the (unsecured) ad-hoc network 51 is listed. In FIG. 5*b*, with the containment measures now in place, the ad-hoc network listing 51 is replaced by the security-protected containment network 59. Note that because the SSID for the containment network is the same as that for the ad-hoc network, it replaces, rather than augments, the listing of the ad-hoc network. Moreover, the containment network 59 is prioritised over the original ad-hoc network in the listing because of its higher precedence as a result of its security level. However, the users of the mobile terminals will not have access to the security log-on details required to access the containment network, so they will be unable to access it and the ad-hoc network will not spread. Users will instead only be able to use the fixed access network 50.

Other criteria by which the consumer products may prioritise network selection, such as signal strength, or infrastructure type (BSS as against IBSS) may also be used to force the devices to default to the containment network

What is claimed is:

1. A method of operating an access point for a first wireless area network system comprising the steps of:
    monitoring for beacon signals transmitted within the area of coverage of the access point;
    on detection of a beacon signal, determining whether the beacon signal advertises a second wireless area network, the second wireless area network being an ad-hoc network having an associated service set,
    if a determination is made that the beacon signal advertises the second wireless area network, initiating a network reconfiguration of the associated service set by generating a new network identity matching that of the second wireless area network, but having a security mechanism giving higher priority than the second wireless area network such that mobile devices default to the new network identity in preference to the second wireless area network, and transmitting a beacon signal with the new network identity.

2. A method according to claim 1 wherein the new network identity is of infrastructure type.

3. A method according to claim 1, wherein the new network identity has a higher transmit power than that of the second wireless area network.

4. A method according to claim 1, comprising the additional step of determining whether operation of the second wireless area network is potentially disruptive of the operation of the first wireless area network, and initiating a network reconfiguration if it is so determined.

5. A method according to claim 4 wherein the additional step comprises determination of the security level required to access the second wireless area network.

6. A method according to claim 4, wherein the additional step comprises determination of the number of terminals that have joined the second wireless area network.

7. A method according to claim 4, wherein the additional step comprises analysis of the network name generated by the beacon signal of the second wireless area network.

8. A method according to claim 1, wherein the new network identity is configured such that it prevents appearance of the network identity relating to the second wireless area network being made available to a connection manager function of a mobile terminal receptive to both the beacon signal of the second wireless area network and the beacon signal containing the new network identity.

9. A method according to claim 8, wherein the new network identity is configured such that it replaces the network identity relating to the second wireless area network in a connection manager menu of the receptive mobile terminal.

10. A method according to claim 1, wherein when a first access point, being one of a group of access points co-operating to provide coverage over a predetermined area, determines that a network reconfiguration of a second wireless area network is to be performed, it co-operates with other members of the said group of access points such that two or more of the access points transmit beacon signals carrying the new network identity.

11. A method of controlling one or more access points for a first wireless area network system, the method comprising:
    monitoring beacon signals transmitted within the area of coverage of the one or more access points;
    determining whether beacon signals detected by said monitoring advertise a second wireless area network, the second wireless area network being an ad-hoc network;
    detect a first security level required to access the second wireless area network;
    generating a new network identity matching that of the second wireless area network, but requiring a second security level for access, the second security level being higher than the first security level, such that mobile devices default to the new network identity in preference to the second wireless area network; and
    causing the one or more access points to transmit a beacon with the new network identity.

* * * * *